(12) United States Patent
Carlson

(10) Patent No.: US 8,267,044 B2
(45) Date of Patent: Sep. 18, 2012

(54) METHOD AND APPARATUS FOR RESCUE OF AQUATIC MAMMALS

(76) Inventor: Scott Allen Carlson, Green Bay, WI (US)

( * ) Notice: Subject to any disclaimer, the term of this patent is extended or adjusted under 35 U.S.C. 154(b) by 0 days.

(21) Appl. No.: 12/813,088

(22) Filed: Jun. 10, 2010

(65) Prior Publication Data

US 2011/0120382 A1    May 26, 2011

Related U.S. Application Data

(60) Provisional application No. 61/264,325, filed on Nov. 25, 2009.

(51) Int. Cl.
*A01K 29/00* (2006.01)
(52) U.S. Cl. .................................... 119/202; 119/203
(58) Field of Classification Search .............. 119/202, 119/203, 843, 201, 728, 725, 712; 43/100, 43/103; 405/3
See application file for complete search history.

(56) References Cited

U.S. PATENT DOCUMENTS

| | | | |
|---|---|---|---|
| 3,580,221 A | 5/1971 | Noyes | |
| 3,722,941 A * | 3/1973 | Seiple et al. | 294/66.1 |
| 3,922,812 A | 12/1975 | Steele | |
| 4,166,648 A | 9/1979 | Creskoff | |
| 4,747,369 A * | 5/1988 | Gotmalm | 119/223 |
| 4,772,170 A | 9/1988 | Oldfield | |
| 4,791,885 A | 12/1988 | Sandlofer | |
| 5,099,778 A * | 3/1992 | Palen | 114/45 |
| H1533 H * | 6/1996 | Bowers et al. | 89/1.11 |
| 5,692,857 A * | 12/1997 | Ness | 405/3 |
| 6,367,737 B1 | 4/2002 | Lohse et al. | |
| 6,682,049 B2 | 1/2004 | Thompson | |
| 6,695,533 B1 * | 2/2004 | Bulmann | 405/3 |
| 2005/0284417 A1 | 12/2005 | Jezl | |

OTHER PUBLICATIONS

The International Search Report and Written Opinion of the International Searching Authority for PCT/US2010/038144.
Hydraulics & Pneumatics, Serving Fluid Power and Motion Control Engineers Worldwide, http://www.hydraulicspnuematics.com/Classes/Articles/ArticleDraw, 2009.

* cited by examiner

*Primary Examiner* — Yvonne Abbott
(74) *Attorney, Agent, or Firm* — Scott R. Cleere

(57) ABSTRACT

An aquatic mammal rescue device and method includes an array of suction cup lifters that adapt to contact and adhere to the body of an aquatic mammal on land or at the surface of water. The array is lifted to raise the aquatic mammal from the ground or water for transport. The rescue device may be part of a vehicle capable of land, sea, and/or air travel or it may be movable by attachment to a separate vehicle of other lifting mechanism (e.g., crane). The device may be used to transport a beached mammal (e.g., a whale) back to the water or to a treatment facility. It may also be used to take an injured animal from the wild or a tank to a treatment facility.

21 Claims, 8 Drawing Sheets

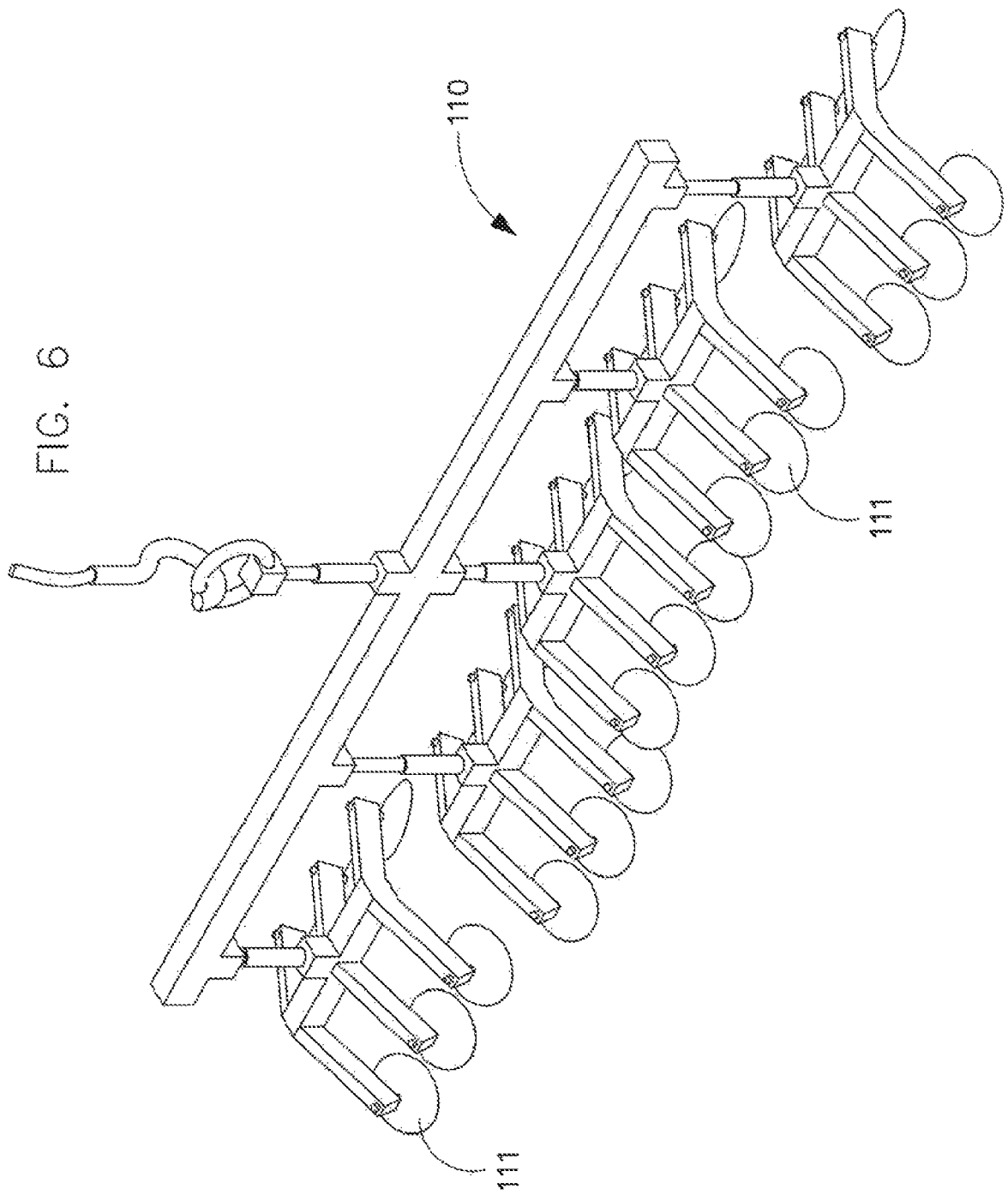

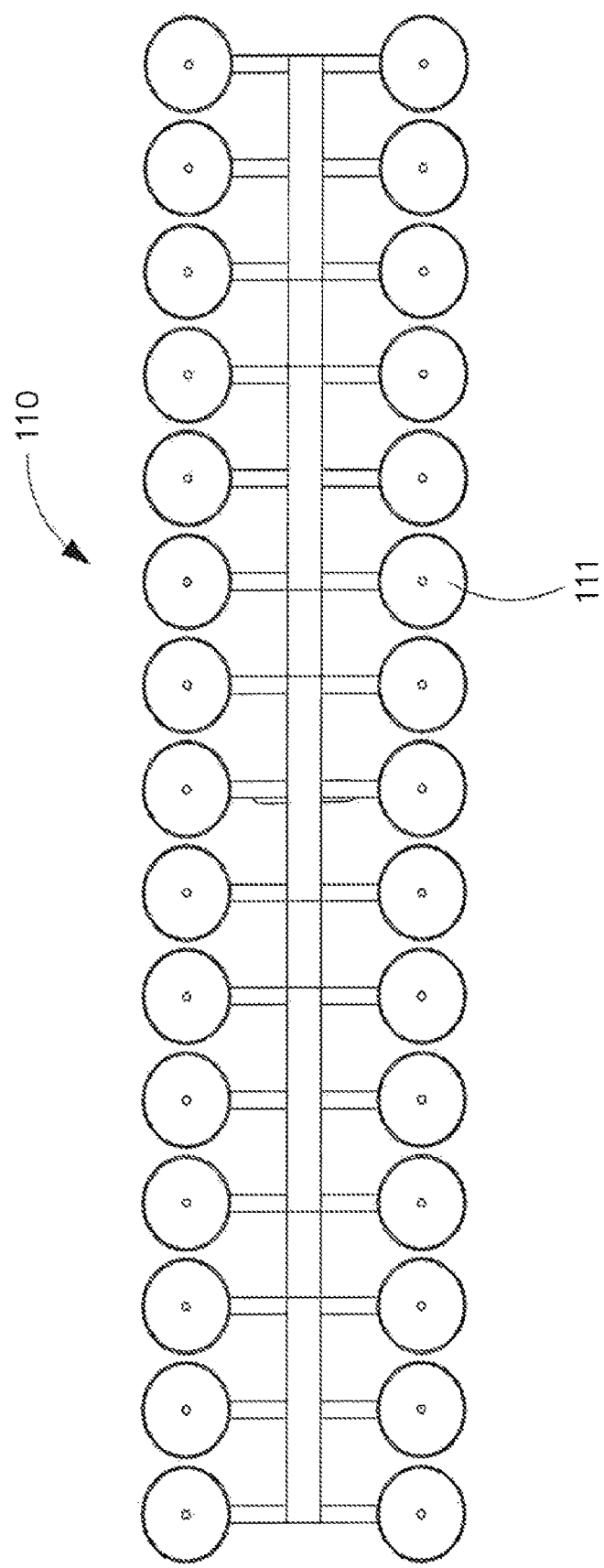

METHOD AND APPARATUS FOR RESCUE OF AQUATIC MAMMALS

PRIORITY

This application claims priority to U.S. Provisional Application 61/264,325 filed Nov. 25, 2009, which is incorporated herein by reference in its entirety.

BACKGROUND

1. Field of the Invention

The present invention relates to methods and devices for rescuing beached sea mammals.

2. Related Art

For reasons that are not entirely understood, whales and other sea mammals (e.g., cetaceans) will swim in to the shore and become beached. Beaching is a term used to describe when a whale comes in to shore and becomes stranded on the shore or beach with no ability to return itself to deeper water where it can swim and maneuver. Although some whales become beached because they are too old and feeble to overcome inshore currents or because they are sick or injured, many beached whales are young and healthy. Without prompt assistance returning to deeper water, beached sea mammals quickly become dehydrated and die.

Conventional methods for rescuing stranded whales generally involve towing the whale into the water with ropes attached to the whale. In many cases, a rope is tied around the whale's tail and it is towed backwards into the water. Unfortunately, this method puts tremendous stress on the whale, particularly on its skin where it contacts the rope and where it is dragged across the ground, which can seriously injure the whale. Tying the rope around the animal's tale also hinders its ability to swim, sometimes causing the whale to drown before it can be released. Sandlofer (U.S. Pat. No. 4,791,885) discloses a harness and flotation device that is attached to the whale's body allowing it to be dragged head-first without restricting tail movement. However, the animal must be pulled across abrasive surfaces (e.g., sand, gravel, and/or rocks) to reach water, which may cause it serious injury.

Sea mammals can also become entangled in netting. In many cases, the animal retains some ability to swim, but is very limited in its ability to dive and/or seek food. The only method for attempting to aid an animal in such straits is to approach it in a small boat and cut the netting away. This is difficult because the animal may attempt to flee and dangerous since the animal is not under control.

SUMMARY

An exemplary embodiment relates to a device for transporting an object comprising one or more suction lifters in an array and a pivot head, wherein the array is connected to and manipulated by the pivot head. The device may also be part of a vehicle and/or be capable of being lifted and moved.

Another exemplary embodiment relates to an amphibious vehicle or aircraft for transporting an object comprising an array of vacuum lifters, a lifting mechanism for raising and lowering the array, the lifting mechanism attached to a frame, and at least one flotation device.

Another exemplary embodiment relates to a method of transporting an object comprising attaching an array of suction cups to the animal, lifting the array of suction cups and the animal, and moving the array of suction cups.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein:

FIG. 6 is a perspective view of an exemplary embodiment of an array of suction cup lifters;

FIG. 7 is a bottom view of FIG. 6;

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

In various exemplary embodiments, the present disclosure is addressed to devices and/or vehicles adapted for transporting beached whales and other aquatic mammals into water where they are capable of independent movement. A device according to the present disclosure may also be useful for engaging a sea mammal that is sick, injured, or otherwise incapacitated for removal from the water to a location for treatment. According to various embodiments, one or more vacuum powered couplers are used to engage the sea mammal and lift it from the ground or water.

In various exemplary embodiments, a vehicle includes a mechanism for attaching to and lifting a beached animal. The animal is grasped by one or more vacuum couplers that rely on vacuum pressure to maintain contact with the animal. The vehicle also includes a mechanism for lifting the animal (e.g., hydraulic lifts or pulleys) and/or the capability of taking flight with the animal held in place above the ground. In various embodiments, the vehicle may be capable of flotation and require a separate mechanism or device (e.g., a helicopter or crane) to provide locomotion to and from a location on the ground.

In various exemplary embodiments, the vehicle is capable of movement in at least two of land water, and/or air. For example, in various embodiments, the vehicle is amphibious with at least one flotation device (e.g., a pontoon boat or multi-hulled boat) and a ground engaging propulsion mechanism (e.g., wheels or tracks). In other embodiments, the vehicle may be an amphibious aircraft (e.g., a helicopter) that is capable of flotation (e.g., pontoons in place of conventional landing gear). In various exemplary embodiments, the rescue device includes the mechanism for lifting the animal with vacuum lifters, but is not independently capable of motion. In such embodiments, the device may be moved using some separate device (e.g., a crane or a helicopter).

Figure 1:
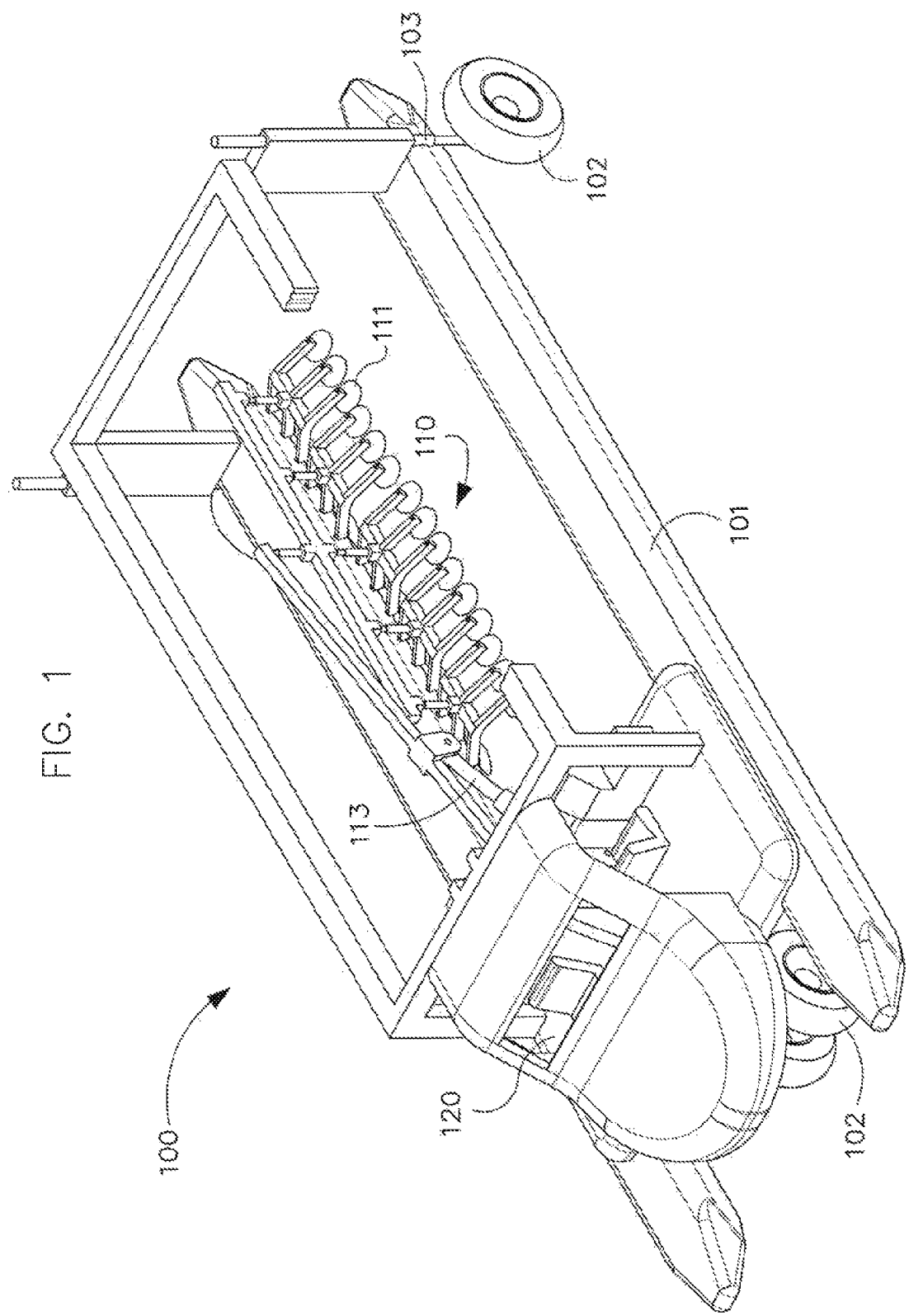
FIG. 1 is a front perspective view of an exemplary embodiment of an amphibious vehicle.
Figure 2:
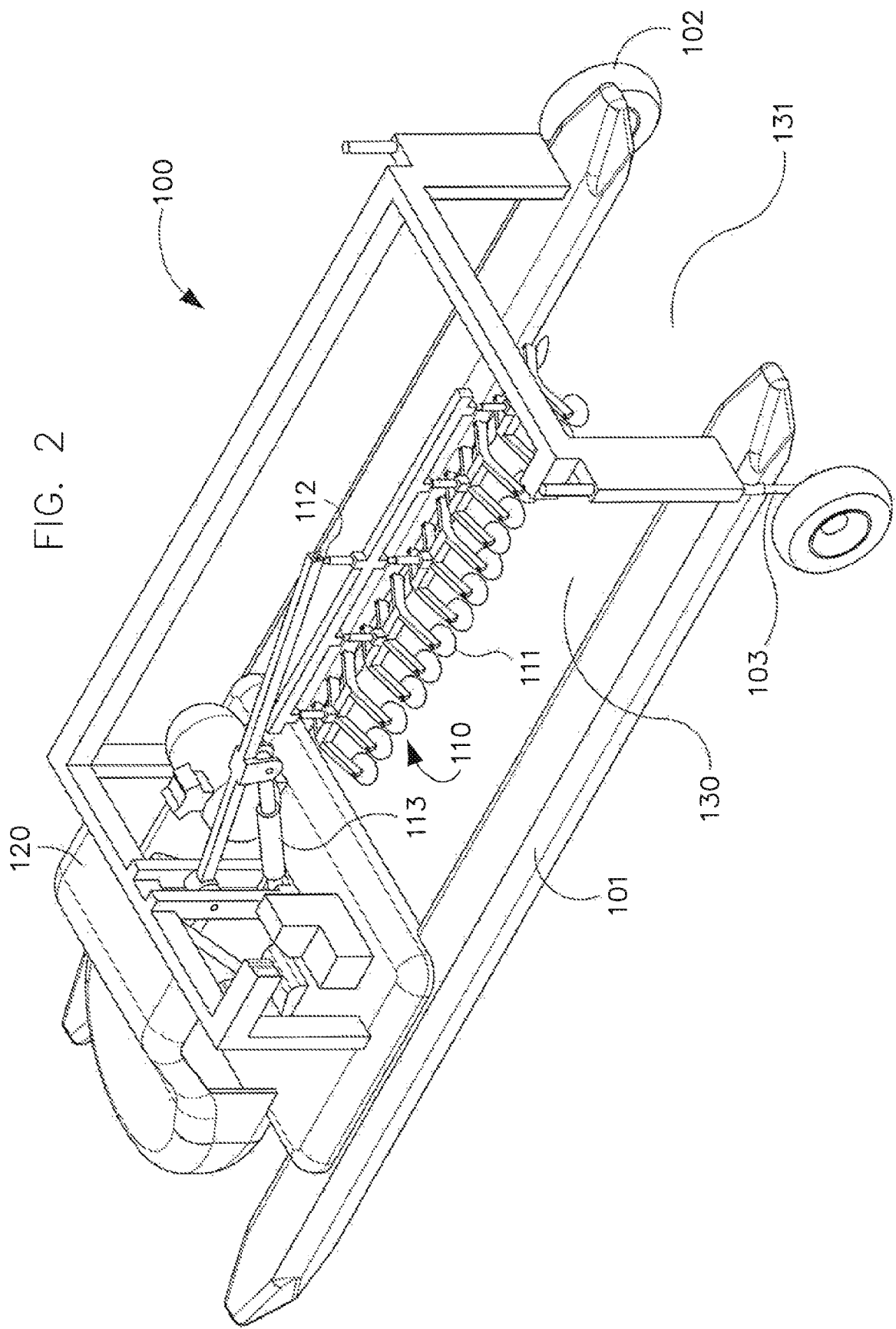
FIG. 2 is a rear perspective view of the embodiment of FIG. 1.
Figure 3:
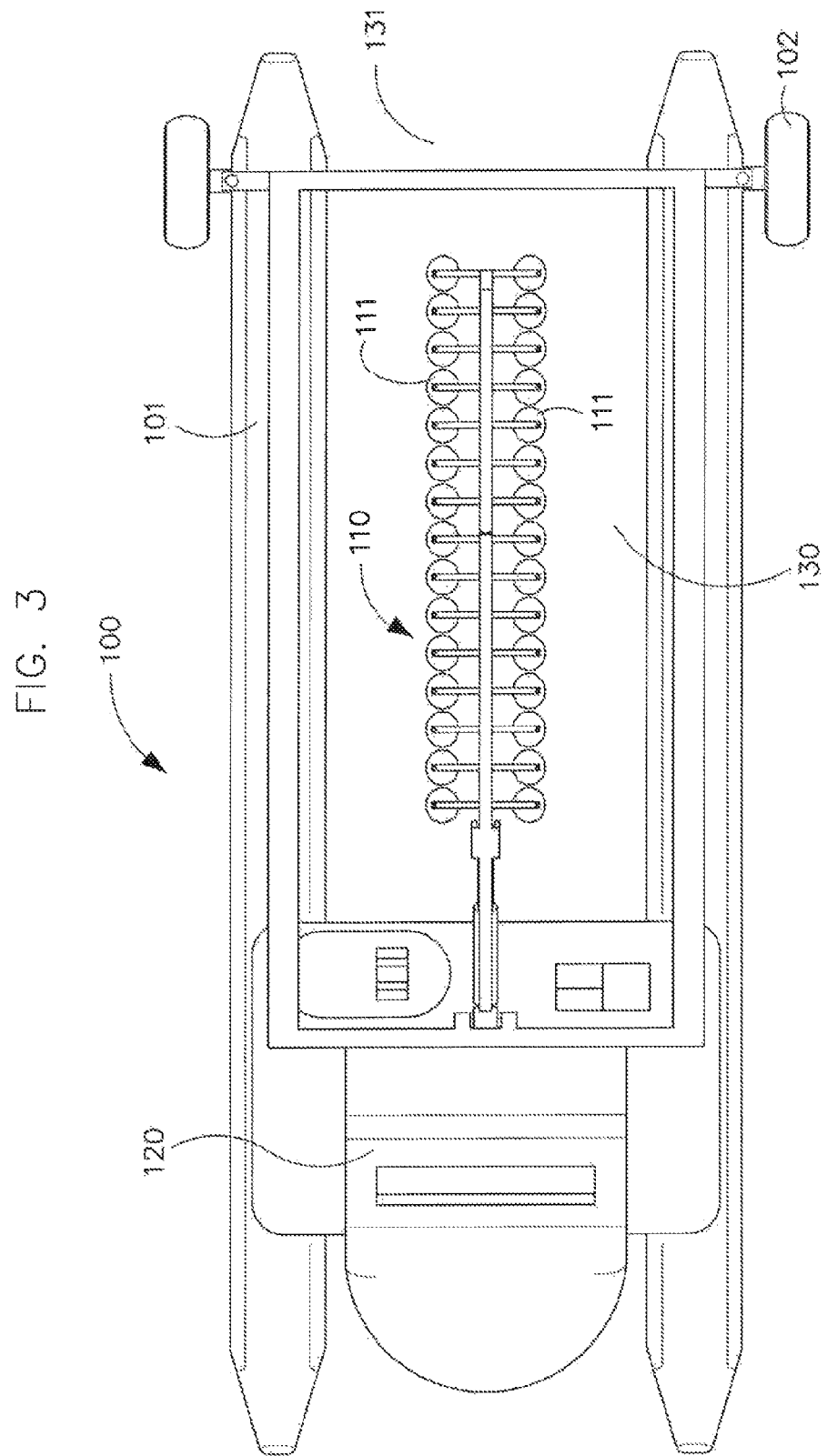
FIG. 3 is a top view of the embodiment of FIG. 1.
Figure 4:
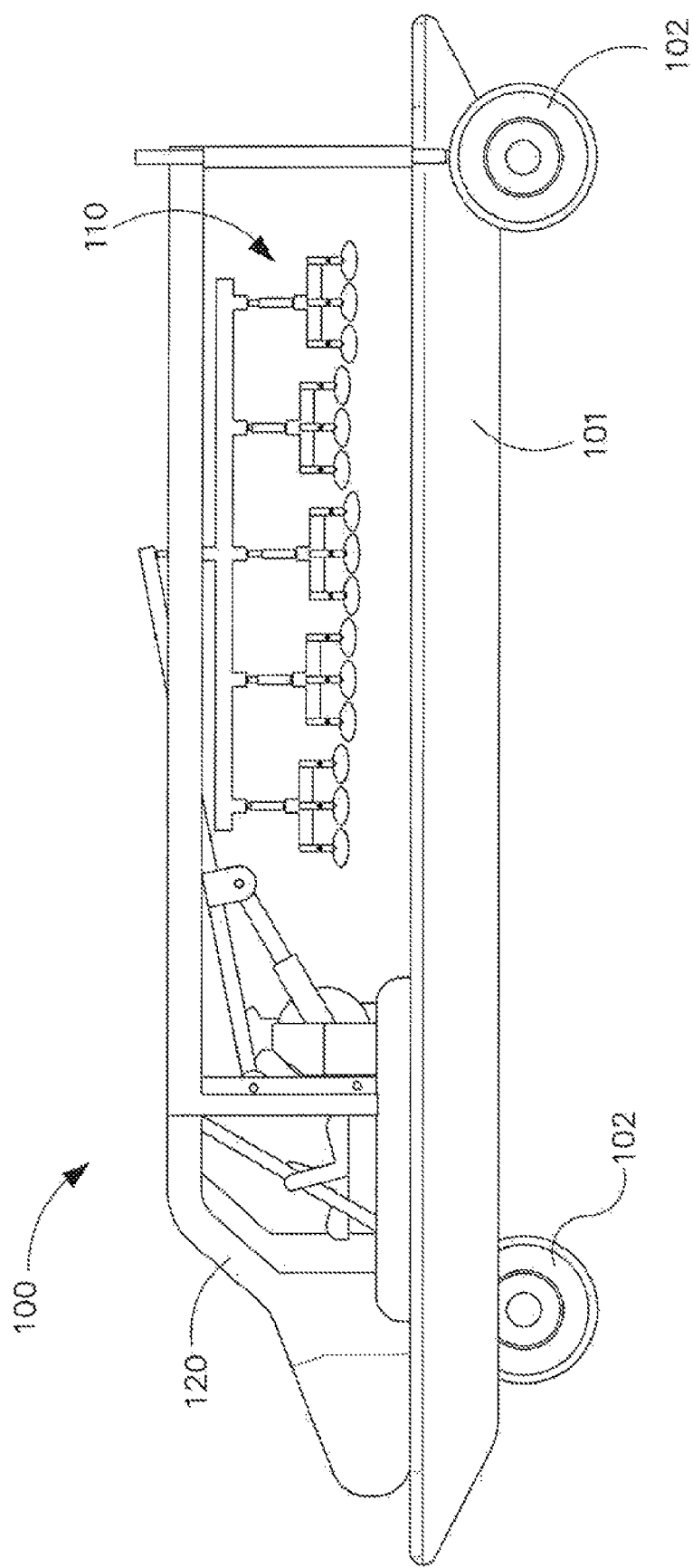
FIG. 4 is a side view of the embodiment of FIG. 1.
Figure 5:
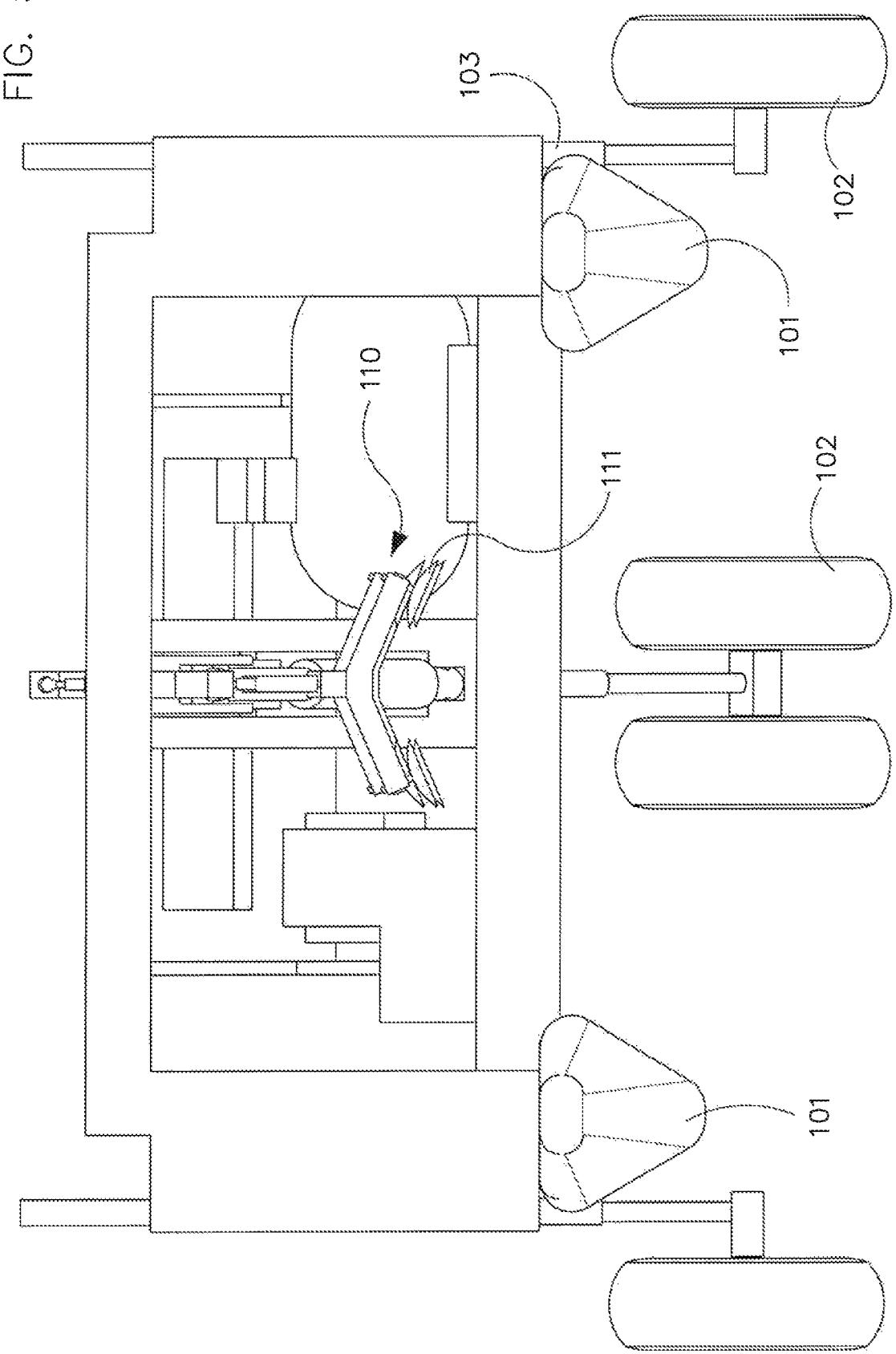
FIG. 5 is a rear view of the embodiment of FIG. 1.

FIGS. 1 and 2 show an exemplary embodiment of an amphibious rescue vehicle 100. In various exemplary embodiments, flotation is provided by flotation devices 101 (e.g., pontoons). Vehicle 100 is shown with two pontoons 101, but any number of pontoons and/or other flotation devices may be used. It should also be noted that any means for providing flotation (e.g., single or multiple hull boats) may be used within the scope of the present disclosure.

In various exemplary embodiments, land travel is provided by tires or wheels 102. In various exemplary embodiments, wheels 102 are retractable (e.g., may be raised). In various exemplary embodiments, wheels 102 are raised and lowered straight up and down using hydraulic pistons 103. In other embodiments, wheels 102 may pivot up and down (e.g., like airplane wheels) or by any other mechanism. In some exemplary embodiments, wheels 102 may be fixed. In various exemplary embodiments, ground or land movement is shown and described using wheels, but it should be understood that any means for ground movement now known or later developed may be used (e.g., wheels, tires, and tracks).

In various exemplary embodiments, as shown in FIGS. 1-5, a cabin 120 is located on top of vehicle 100 near the front, which contains the control mechanisms for vehicle 100 and its systems. In various other embodiments, vehicle 100 and/or any of its systems may be controlled from a location remote from vehicle 100.

A vacuum lifter array 110 is located to the rear of the cabin 120. FIGS. 1-3 and 5-7 show a vacuum lifter array 110 having two rows of vacuum lifters 111. In various exemplary embodiments, the number and spatial arrangement of vacuum lifters 111 in a vacuum lifter array 110 may be varied (e.g., more or fewer rows, aligned or offset rows). In various exemplary embodiments, vacuum lifters 111 may have any shape and/or size and preferably have sufficient flexibility to adapt to the animal's shape for a tight seal.

In various exemplary embodiments, vacuum lifter array 110 is manipulated at least in part by a pivot head. The pivot head has seven action motions (similar to a human wrist), which allows the vacuum lifter array 110 to be moved into virtually any needed position to attach to and grasp an animal whether or not it is positioned for optimal lifting (e.g., lying on its belly) as a beached whale may be found in a variety of positions (e.g., lying on its belly or its side). The pivot head allows the vacuum lifter array(s) 110 to be oriented to the animal regardless of how the animal is positioned. For example, if the animal is lying on its side, the suction couplers 111 are manipulated to grasp the animal and rotate and/or lift the animal so that it is lying on its belly as part of the process of lifting the animal for transportation.

In the embodiments of FIGS. 1-5, vacuum lifter array 110 is raised and lowered by one or more hydraulic pistons 113, but any mechanism for raising or lowering vacuum lifter array 110 may be substituted (e.g., hoists and pulleys). In other exemplary embodiments, vacuum lifter array 110 may be raised and lowered by a plurality of mechanisms allowing vacuum lifter array 110 to be manipulated by selectively raising and lowering different portions to alter its orientation relative to the vehicle. Such embodiments allow vacuum lifter array 110 to be oriented appropriately for coupling to animals in a wide variety of positions.

The embodiment of FIGS. 1-5 has two jointly mounted wheels 102 to the front of the vehicle and two wheels 102 to the rear (one on each side), but the number and location of wheels 102 may be varied (e.g., to the inside or the outside of the flotation devices). In various exemplary embodiments, one or more of wheels 102 may be capable of turning or pivoting to change the direction of vehicle 100.

In various exemplary embodiments, such as shown in FIGS. 1-5, there is an open space 130 between the flotation devices 101 and below the vacuum lifter array 110. In various exemplary embodiments, there is an opening 131 in at least one of the front, back, and or sides of vehicle 100. In the embodiment of FIGS. 1-5, opening 131 is at the rear, but it should be noted that it may be located anywhere on the vehicle. In other embodiments, such as, for example, embodiments with four wheels, there could be openings 131 at both the front and back of vehicle 100. Wherever located, the opening is a space through which the beached sea mammal may "enter" the interior of the vehicle. In various exemplary embodiments, such as shown in FIGS. 1-5, the vehicle is designed to back up "over" the beached mammal so that it is positioned below vacuum lifter array 110.

In various exemplary embodiments, vehicle 100 uses one or more outboard motors (not shown) for propulsion in water. The outboard motor(s) may be capable of being raised and lowered, as needed, or may be fixedly attached. In various other exemplary embodiments, any means of propulsion (e.g., inboard motors, outboard motors, air propellers, paddle wheels) and steering on water now known or later developed may be used.

Although the vehicle is shown herein with wheels to the outside of the flotation pontoons, no particular arrangement of floatation devices and/or wheels is required. For example, wheels or tracks may be located to any side of the flotation devices, including directly below or within the flotation devices. In various exemplary embodiments, one or more motors are used to turn one or more of the wheels to provide land movement. Any type of motor and/or engine or combination thereof (e.g., electric motors, internal combustion engines, etc.) may be used.

FIGS. 6 and 7 show an exemplary embodiment of a vacuum lifter array 110. In various exemplary embodiments, vacuum lifter array 110 comprises multiple suction couplers 111. Vacuum lifter array 110 is adapted to be lifted by any means including, for example, cranes on land or ships and helicopters. In various exemplary embodiments, vacuum lifter array 110 may be attached to one or more flotation devices, which facilitates working with animals near the water surface.

Figure 9:
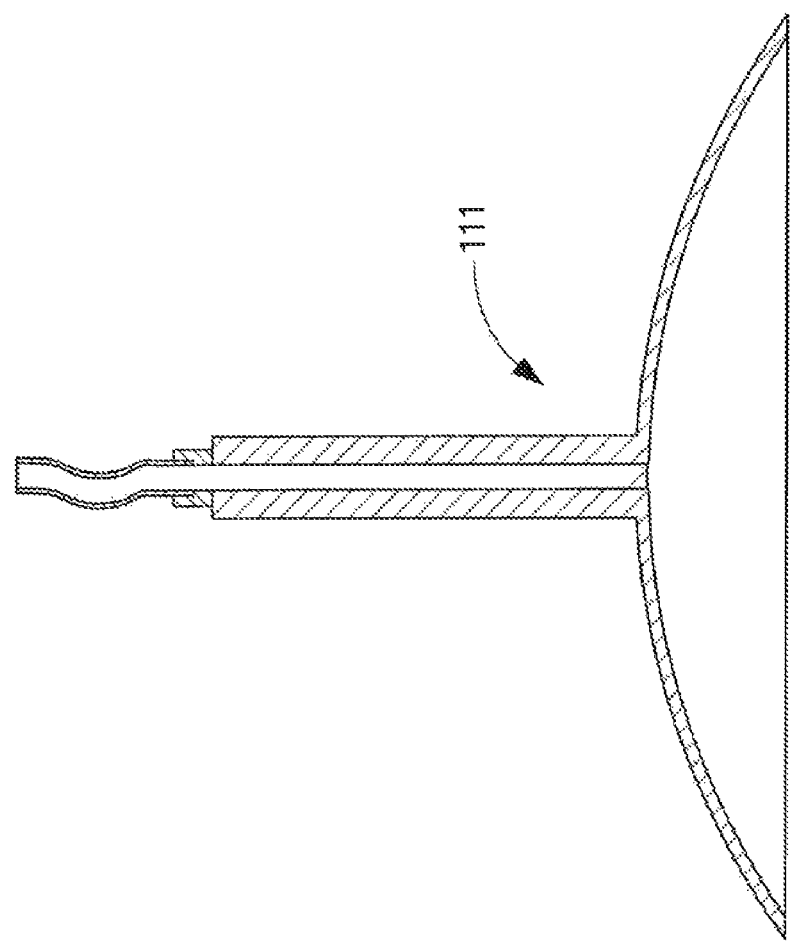
FIG. 9 is a cross-sectional side view of the suction cup lifter embodiment of FIG. 8.
Figure 8:
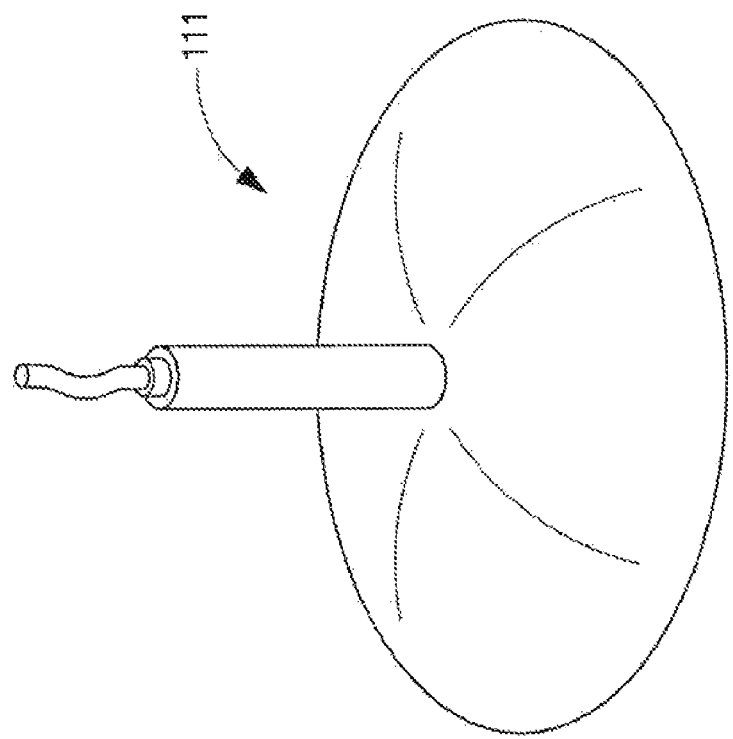
FIG. 8 is a top perspective view of an exemplary embodiment of a suction cup lifter.

In various exemplary embodiments, as shown in FIGS. 8 and 9, the disclosed methods and apparatus use vacuum couplers 111 in an array 110 to attach to an aquatic mammal. In various exemplary embodiments, vacuum coupler 111 is generally round in shape, but it should be appreciated that no particular shape is required. In various exemplary embodiments, the outer edge of the vacuum coupler 111 is flexible and/or padded to insure a more airtight connection to an aquatic mammal's skin. Vacuum couplers 111 are grouped in one or more arrays 110 to increase the number of attachment points and total area of attachment between the disclosed devices and an aquatic mammal. The size and configuration of vacuum lifter arrays 110 may be varied considerably for use with a wide variety of aquatic mammals.

In various exemplary embodiments, an array of vacuum lifters is used to secure the sea mammals body. By using an array of vacuum lifters over a significant portion of a beached sea mammal's body, according to various exemplary embodiments, the disclosed device is not only able to lift a large sea mammal, but do so without injuring the animals skin by spreading the lifting force over the animal's body. In various exemplary embodiments, the suction force may be directed to all or part of the array so that sea mammals that are too small to be contacted by the entire array may be lifted. After the animal is lifted, a harness may be placed under the animal to provide additional support and reduce pressure on its skin.

Any type of harness or material may be used, such as, for example, netting, straps, mesh, and solid sheets.

In various exemplary embodiments, the array of vacuum lifters is flexible or adjustable to adapt to the varying shape and size of different sea mammals (e.g., different species or different sizes of the same species). In various exemplary embodiments, individual vacuum lifters may be adjustably attached (e.g., flexibly or pivotally attached) to the array. In these or other exemplary embodiments, subgroups of vacuum lifters may be adjustably attached (e.g., flexibly or pivotally attached) to the array as a group. In various exemplary embodiments, the vacuum lifter array may also include moving or flexible portions to aid in attaching the array to a beached sea mammal. Although the methods and apparatus of the present disclosure have been described in connection with the transportation of sea mammals, it should be appreciated that the methods and apparatus may be designed to transport other objects including other animals and inanimate objects such as, for example, tanks and other containers, submersible vehicles.

As utilized herein, the terms "approximately," "about," "substantially," and similar terms are intended to have a broad meaning in harmony with common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom" or "front" and "back") in this description are merely used to identify various elements, as are oriented in the figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with two members or two members and any additional intermediate members being integrally formed as a single unitary body with one another or with two members or two members and any additional intermediate members being attached to one another. Such joining may be permanent in nature or may be removable or releasable in nature.

It should be appreciated that the construction and arrangement of the aquatic mammal rescue devices, as shown in the various exemplary embodiments, is illustrative only. While the aquatic mammal rescue devices, according to this invention, have been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the aquatic mammal rescue devices, according to this invention, as set forth above, are intended to be illustrative, not limiting. Various Changes may be made without departing from the spirit and scope of the invention. Therefore, the description provided above is intended to embrace all known or later-developed alternatives, modifications, variations, improvements, and/or substantial equivalents.

What is claimed is:

1. A device for transporting an aquatic mammal, comprising:
   an array of vacuum couplers comprising two or more rows of vacuum couplers; and
   a lifting mechanism for raising and lowering the array;
   wherein the device is adapted for attachment to a separate vehicle or other device for lifting and moving the device.

2. The device of claim 1, further comprising a pivot head wherein the array is connected to and manipulated by a pivot head.

3. The device of claim 1, further comprising one or more flotation devices.

4. The device of claim 1, further comprising a harness.

5. An amphibious vehicle or aircraft for transporting an aquatic animal, comprising:
   an array of vacuum lifters adapted for coupling to the body of in aquatic animal;
   a lifting mechanism for raising and lowering the array, the lifting mechanism; and
   at least one flotation device.

6. The amphibious vehicle of claim 5 further comprising at least one ground movement mechanism.

7. The amphibious vehicle of claim 6 wherein the at least one ground movement mechanism comprises wheels.

8. The amphibious vehicle of claim 7 wherein at least one of the wheels is retractable.

9. The amphibious vehicle of claim 5 further comprising a flight mechanism.

10. The amphibious vehicle of claim 5 wherein the array of vacuum lifters is connected to a pivot head.

11. The amphibious vehicle of claim 5 wherein the at least one flotation device comprises pontoons.

12. The device of claim 5, further comprising a harness.

13. A method of transporting an aquatic animal, comprising:
    attaching an array of suction cups having two or more rows of suction cups to the animal;
    lifting the array of suction cups and the animal; and
    moving the array of suction cups attached to the animal.

14. The method of claim 13, wherein the step of moving the animal further comprises moving the animal with a land vehicle.

15. The method of claim 13, wherein the step of moving the animal further comprises moving the animal with a water vehicle.

16. The method of claim 13, wherein the step of moving the animal further comprises moving the animal with an amphibious vehicle.

17. The method of claim 13, wherein the step of moving the animal further comprises, moving the animal with a flying vehicle.

18. The method of claim 13, wherein the step of moving the animal further comprises moving the animal with a flying vehicle capable of floating.

19. The method of claim 13, wherein the step of moving the animal further comprises lifting the array with a land-based crane or water-based crane.

20. The method of claim 13, further comprising supporting the animal from beneath.

21. The method of claim 20, wherein the step of supporting the animal from beneath comprises the use of a harness.

* * * * *